Patented Dec. 4, 1951

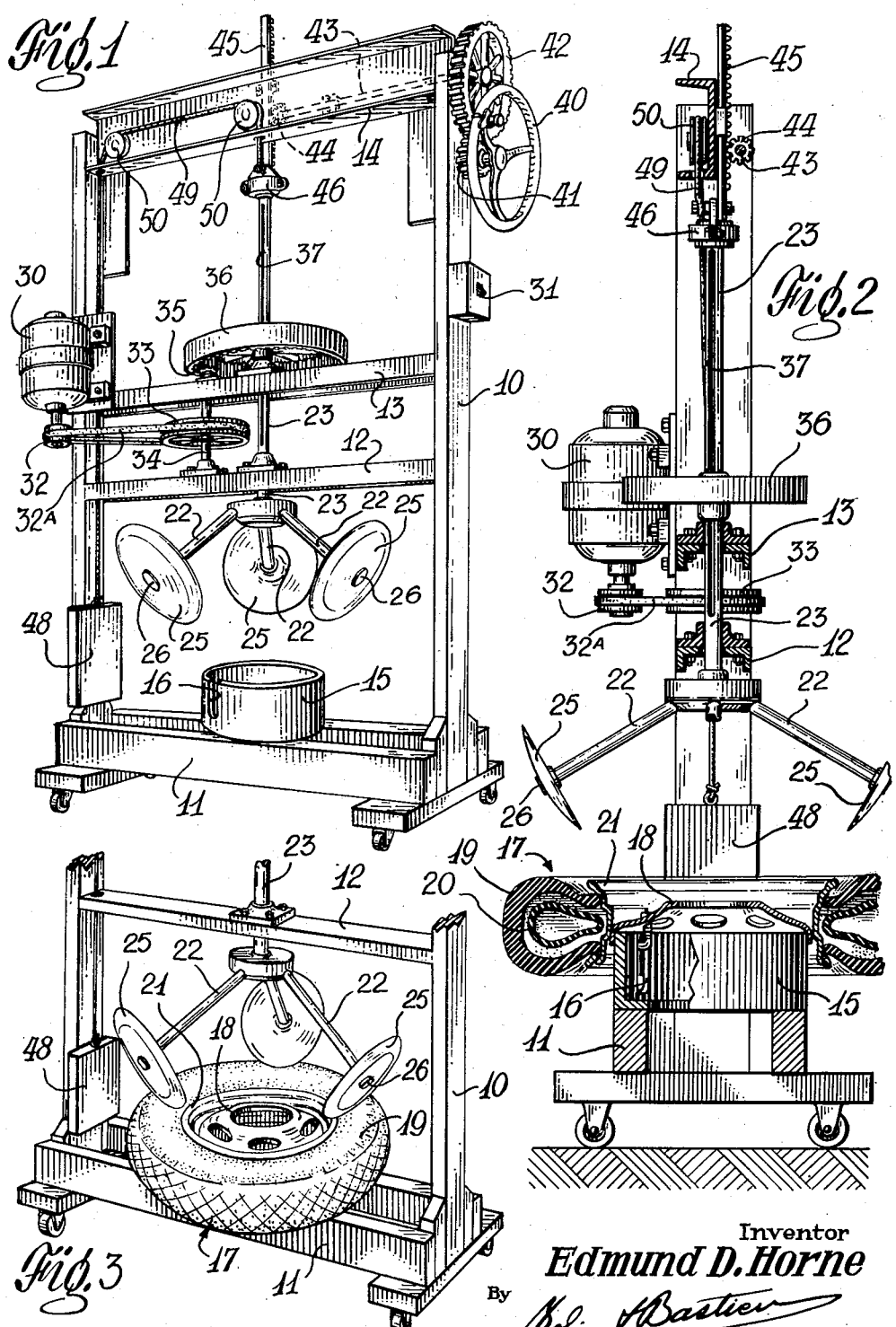

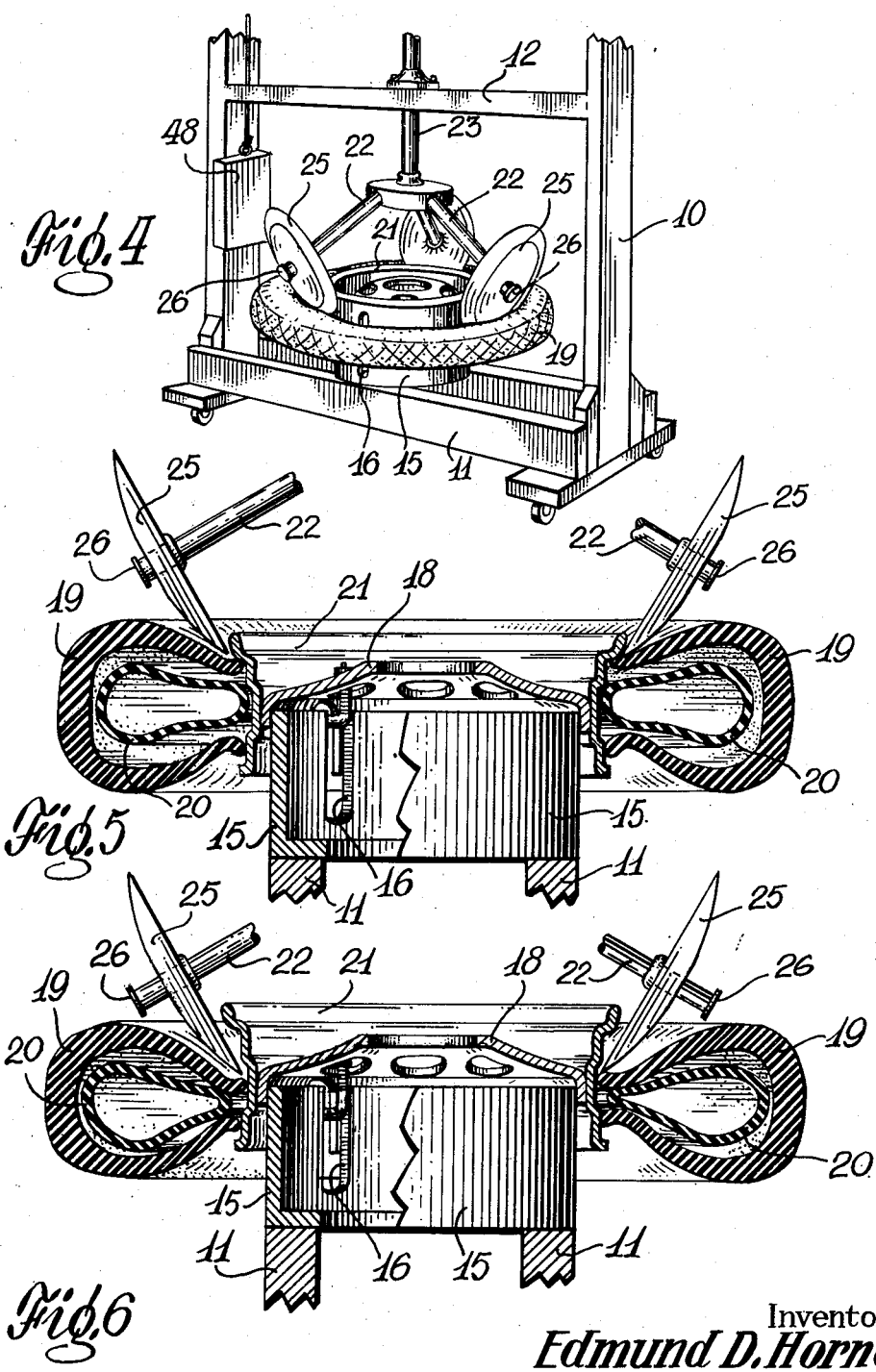

2,577,684

UNITED STATES PATENT OFFICE 2,577,684

CIRCUMFERENTIALLY TRAVELING TYPE
FRAME MOUNTED TIRE REMOVER

Edmund Donatus Horne, Enfield, Nova Scotia,
Canada

Application March 16, 1949, Serial No. 81,806
In Canada May 28, 1948

2 Claims. (Cl. 157—1.24)

The present invention relates to a tire remover.

A serious problem is often encountered in automotive-vehicle service stations, or at airports, where it becomes necessary to remove tires from wheel rims. This is especially true in the case of heavy truck tires or those used for large airplanes. Again, the situation is often further complicated where the tire has become bound to the rim in some manner, as by rust or by congealed dirt and grime. In all of these instances considerably force must be exerted to force the tire casing off the wheel rim, and the nature of wheel construction is such that in the past it has been found difficult to apply appropriate leverage.

Of course several tools have been devised for this purpose, but they are all subject to one or more serious disadvantages. One must be careful, for example, not to injure the tire casing during the removal operation. For this reason, a simple lever with a sharp head for insertion between rim and tire at one point of the wheel circumference will not be satisfactory. And the more complicated leverage devices used in practice are difficult to apply to the wheel. Most of them require clamping and adjustment relative to the wheel before force may safely be applied. And others require further adjustment during the removal operation. In every case there is the likelihood that removal of a single tire will consume much time and energy on the part of the worker, and the latter may be required to have some skill and experience in such operations.

The main object of the present invention is to provide an improved tire-removing machine adapted to quickly remove tires from even the heaviest of wheels.

Another important object is to provide a machine of the type set forth wherein the removal operation is accomplished without damage to the tire and without effort or skill on the part of the operator.

Yet another object resides in the provision of a tire remover of the character described which is modifiable to handle removal operations from wheels of a wide variety of sizes and types.

Still another object resides in the provision of a machine as set forth above wherein force required for the removal operation may be delivered by a conventional source of power under the operator's control.

And yet another object is to provide a machine of the nature set forth which is practical and durable in design and construction, and which may be provided economically in view of the savings in time and effort effected thereby.

Other objects and advantages will become apparent, or be further pointed out, in the description to follow.

As an example, and for purposes of illustration only, a preferred embodiment of the machine is shown in the annexed drawings, wherein:

Figure 1 shows a perspective view of a complete machine including source of power and controlled means of applying same;

Figure 2 shows a sectional elevation of the machine of Fig. 1 with a wheel in position relative thereto for removal of the tire;

Figure 3 shows a perspective view of the lower, tire-removing portion of the machine of Figure 1 with a wheel in position as in Fig. 2;

Figure 4 shows a view similar to Fig. 3 but with the parts located as during the tire-removal operation;

Figure 5 shows a sectional elevation through the wheel and its support when in operative position just prior to commencement of the removal of the tire by the machine working parts, and Figure 6 shows a similar view as the said working parts force the tire from the wheel rim.

In its most practical embodiment, the invention comprises a base upon which a wheel is mounted and over which is suspended a downwardly-directed tripod formation. Each lower extremity of the tripod carries a rotatable disc which are accordingly in planes canted relative to the wheel. The lowest point of the circumference of each disc is presented to the edge of the wheel rim, and the disc circumferences are bevelled so as to be capable of intrusion against the wheel rim for forcing the tire therefrom. As the tripod is rotated and positively forced downward, the discs roll around the rim exterior and at the same time press down on the tire casing. Accordingly, pressure is quickly applied all around the casing to force same down off the rim.

Naturally with a tripod-like formation, three discs press down against the tire casing. However, it would also be practical to use two discs, or more than three, and to support them accordingly. Another feature of the invention would be to allow the discs an upwardly-sliding motion, as well as rotation, on their supports (the tripod lower extremities). This would enable the discs to keep moving in as they are pressed downward so that the lower point of each disc circumference will press against the rim surface and hence refrain from cutting or pinching the tire casing.

From the foregoing, it will be appreciated that the fundamental principles of the invention consist in positively and simultaneously applying at equally spaced intervals around a wheel rim, means insertable between the top of the tire casing and the rim, and urging said means onward to press the casing away from the rim; the said means being swung around the wheel rim during the removal operation and preferably consisting of rotatably-supported discs capable of limited axial movement.

Referring now to the drawing, wherein the same reference characters denote corresponding parts throughout, Figure 1 shows the machine to be supported in a frame, including lateral uprights 10, transverse base members 11, transverse beams 12 and 13, and a transverse top bar 14. An annular upright ring 15 is mounted on members 11 to act as a wheel support. It may have a slot 16 to accommodate the valve stem of a wheel laid thereupon, otherwise the wheel 17 need not be adjusted or clamped with reference to its support as is usually the case with tire removing machines now in use.

The wheel 17 being laid upon the support, with hub 18 uppermost and a tire casing 19 and tube 20 on rim 21, it is seen that the tripod-like formation referred to above includes legs 22 projecting downward and outward from the lower end of a shaft 23 aligned with the wheel axis. Upon the lower extremity of each leg 22 is journalled a disc-like member 25. The latter is prevented from outward movement by a hubbed or enlarged extremity 26 on leg 22, but may, as noted above, be permitted to slide inwardly.

The circumference of each disc 25 is bevelled for easier insertion under the top of rim 21 above tire casing 19. Moreover, the spread of legs 22, and hence the spacing from the wheel axis of the lowest point of the discs' circumferences, is determined by the standard rim circumference of the wheels with which the machine will be used. If shaft 23 be now rotated and positively lowered, the discs will be brought to bear against the outside of the rim, first intruding between the latter and the top of the tire casing (Fig. 5), and then forcing the casing down off the rim (Figs. 4 and 6).

Naturally, for proper operation of the machine, any suitable means may be provided for rotating shaft 23 (and hence moving the discs around the rim periphery) and for urging the discs downward. In the present instance, an electric motor 30 provides a source of power controlled by switch 31 and acting through pulleys 32 and 33 (connected by belt 32A) to rotate upright shaft 34. The latter carries a pinion 35 engaging the teeth of a large gear wheel 36 keyed to shaft 23. The key engaging wheel 36 with shaft 23 rides in a diametrical slot 37 in the latter, and hence permits the shaft to move up or down with respect to its gear. This movement may be positively controlled by a handwheel 40 driving transverse shaft 43 through gears 41 and 42. Shaft 43 carries a pinion 44 engaging a rack-like extension 45 rotatably coupled at 46 to the upper end of shaft 23. A counterbalancing weight 48 may be connected to shaft 23 at 46 (by cord 49 over pulleys 50) to normally hold the discs in an upper, inoperative position.

The present invention clearly fulfills the objectives hereinbefore set forth. To remove a tire, it is only necessary to lay wheel 17 upon support 15, turn on the power to the motor, and depress the whirling discs 25 by means of handwheel 40. The discs remove the tire quickly and without damage from the rim, no matter how stiffly they are bound together. Little or no skill is required, no clamping or adjustment is necessary when using standard-size wheels, and the operator needs exert but little effort.

It will therefore be understood that I do not limit myself to the particular embodiment of my invention herein shown and described, since obviously various alterations might be made in the same as regards size, shape and arrangement of parts, the number of discs employed and manner of supporting same with respect to the shaft 23, without departing from the spirit of the invention or the scope of the subjoined claims.

Having thus described my invention, I claim:

1. In a device for removing tires from wheel rims, a support for the wheel, a shaft coaxial with the wheel and upwardly spaced therefrom, arms extending radially outwardly from said shaft, rigid therewith, and downwardly inclined relatively thereto, discs mounted for rotational and translational movement on said arms and adapted to abut the wheel rim and a side of the tire at their junction, said discs movable towards the wheel axis along the side of said side of the tire to exert a wedging action between the latter and the adjacent face of said rim whereby said tire is urged from said rim, means for rotating said shaft and means independent of the rotational movement of said shaft for urging same towards the wheel.

2. In a device of the character described for removing tires from wheel rims, a wheel support, a shaft axially aligned with and upwardly spaced from the wheel having at equally-spaced intervals support-legs secured thereto, said support legs extending radially outwardly and downwardly therefrom towards the wheel periphery, and a disc rotatably and slidably mounted on the free end of each leg, the circumference of each disc bevelled, and having a face adapted to contact the side surface of the tire, said shaft movable towards the wheel so that the discs press at one point on the circumference of each against the junction of tire and rim, means for positively moving the shaft towards the wheel, and a driving wheel slidably keyed to said shaft for rotating the same, whereby said discs urge the tire from the rim.

EDMUND DONATUS HORNE.

REFERENCES CITED

The following references are of record in the file of this patent:

UNITED STATES PATENTS

| Number | Name | Date |
|---|---|---|
| 1,552,928 | Hershon | Sept. 8, 1925 |
| 1,720,615 | Welch | July 9, 1929 |

FOREIGN PATENTS

| Number | Country | Date |
|---|---|---|
| 578,761 | Great Britain | July 10, 1946 |